US006535843B1

(12) United States Patent
Stylianou et al.

(10) Patent No.: US 6,535,843 B1
(45) Date of Patent: Mar. 18, 2003

(54) AUTOMATIC DETECTION OF NON-STATIONARITY IN SPEECH SIGNALS

(75) Inventors: Ioannis G. Stylianou, Madison, NJ (US); David A. Kapilow, Berkeley Heights, NJ (US); Juergen Schroeter, New Providence, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/376,456

(22) Filed: Aug. 18, 1999

(51) Int. Cl.[7] .......................... G10L 11/04; G10L 19/02; G10L 15/06

(52) U.S. Cl. ......................... 704/207; 704/203; 704/236

(58) Field of Search ................................. 704/207, 206, 704/208, 209, 265, 211, 220, 266

(56) References Cited

U.S. PATENT DOCUMENTS

| | | | | | |
|---|---|---|---|---|---|
| 4,720,862 | A | * | 1/1988 | Nakata et al. | 704/214 |
| 4,802,224 | A | * | 1/1989 | Shiraki et al. | 704/245 |
| 5,596,676 | A | * | 1/1997 | Swaminathan et al. | 704/208 |
| 5,734,789 | A | * | 3/1998 | Swaminathan et al. | 704/206 |
| 5,799,276 | A | * | 8/1998 | Komissarchik et al. | 704/251 |
| 5,926,788 | A | * | 7/1999 | Nishiguchi | 704/265 |
| 6,101,463 | A | * | 8/2000 | Lee et al. | 704/207 |
| 6,240,381 | B1 | * | 5/2001 | Newson | 704/214 |

OTHER PUBLICATIONS

Nandasena, "Spectral Stability Based Event Localizing Temporal Decomposition", *Proceedings of IEEE Int. Conf. Acoust., Speech, Signal Processing*, vol. 2, pp. 957–960, 1998.

Verhelst et al, "An Overlap–add Technique Based on Waverform Similarity (WSOLA) for High Quality Time–Scale Modification of Speech", *Proc. IEEE ICASSP*–93, pp. 554–557, 1993.

* cited by examiner

*Primary Examiner*—Doris H. To
*Assistant Examiner*—Daniel A. Nolan
(74) *Attorney, Agent, or Firm*—Henry T. Brendzel

(57) ABSTRACT

When necessary to time scale a speech signal, it is advantageous to do it under influence of a signal that measures the small-window non-stationarity of the speech signal. Three measures of stationarity are disclosed: one that is based on time domain analysis, one that is based on frequency domain analysis, and one that is based on both time and frequency domain analysis.

25 Claims, 3 Drawing Sheets

AUTOMATIC DETECTION OF NON-STATIONARITY IN SPEECH SIGNALS

RELATED APPLICATION

This application is related to an application, filed on Aug. 18, 1999, as application Ser. No. 09/376455, now U.S. Pat. No. 6,324,501, titled "Signal Dependent Speech Modifications".

BACKGROUND OF THE INVENTION

This invention relates to electronic processing of speech, and similar one-dimensional signals.

Processing of speech signals corresponds to a very large field. It includes encoding of speech signals, decoding of speech signals, filtering of speech signals, interpolating of speech signals, synthesizing of speech signals, etc. In connection with speech signals, this invention relates primarily to processing speech signals that call for time scaling, interpolating and smoothing of speech signals.

It is well known that speech can be synthesized by concatenating speech units that are selected from a large store of speech units. The selection is made in accordance with various techniques and associated algorithms. Since the number of stored speech units that are available for selection is limited, a synthesized speech that derived from a catenation of speech units typically requires some modifications, such as smoothing, in order to achieve a speech that sounds continuous and natural. In various applications, time scaling of the entire synthesized speech segment or of some of the speech units is required. Time scaling and smoothing is also sometimes required when a speech signal is interpolated.

Simple and flexible time domain techniques have been proposed for time scaling of speech signals. See, for example, E. Moulines and W. Verhelst, "Time Domain and Frequency Domain Techniques for Prosodic Modification of Speech", in *Speech Coding and Synthesis,* pp. 519–555, Elsevier, 1995, and W. Verhelst and M Roelands, "An overlap-add techniques based on waveform similarity (WSOLA) for high quality time-scale modification of speech", *Proc. IEEE ICASSP*-93, pp. 554–557, 1993.

What has been found is that the quality of time-scaled signal is good for time-scaling factors close to one, but a degradation of the signal is perceived when larger modification factors are required. The degradation is mostly perceived as tonalities and artifacts in the stretched signal. These tonalities do not occur everywhere in the signal. We found that the degradations are mostly localized in areas of transitions of speech, often at the junction of concatenation speech units.

SUMMARY

We discovered that the aforementioned artifacts problem is related to the level of stationarity of the speech signal within a small interval, or window. In particular, we discovered that speech signals portions that are highly non-stationary cause artifacts when they scaled and/or smoothed. We concluded, therefore, that the level of non-stationarity of the speech signal is a useful parameter to employ when performing time scaling of synthesized speech and that, in general, it is not desirable to modify or smooth highly non-stationary areas of speech, because doing so introduces artifacts in the resulting signal. To that end, a measure of the speech signal's non-stationarity must be developed.

A simple yet useful indicator of non-stationarity is provided by the transition rate of the RMS value of the speech signal. Another measure of non-stationarity that is useful for controlling time scaling of the speech signal is the transition rate of spectral parameters, normalized to lie between 0 and 1. A more improved measure of non-stationarity that is useful for controlling time scaling of the speech signal is provided by a combination of the transition rates of the RMS value of the speech signal and the LSFs, normalized to lie between 0 and 1.

DETAILED DESCRIPTION

Generally speaking, speech signal is non-stationary. However, when the speech signal is observed over a very small interval, such as 30 msec, an interval may be found to be mostly stationary, in the sense that its spectral envelope is not changing much and in that its temporal envelop is not changing much. Synthesizing speech from speech units is a process that deals with very small intervals of speech such that some speech units can be considered to be stationary, while other speech units (or portions thereof) may be considered to be non-stationary.

None of the prior art approaches for concatenation of speech units or time scaling, smoothing and interpolation take account of whether the signal that is concatenated, scaled, or smoothed is stationary or not stationary within the immediate vicinity of where the signal is being time scaled or smoothed. In accordance with the principles disclosed herein, modification (e.g. time scaling, interpolating, and/or smoothing) of a one dimensional signal, such as a speech signal, is performed in a manner that is sensitive to the characteristics of the signal itself. That is, such modification is carried out under control of a signal that is dependent on the signal that is being modified. In particular, this control signal is dependent on the level of stationarity of the signal that is being modified within a small window of where the signal is being modified. In connection with speech that is synthesized from speech units, the small window may correlate with one, or a small number of speech units.

Figure 1:
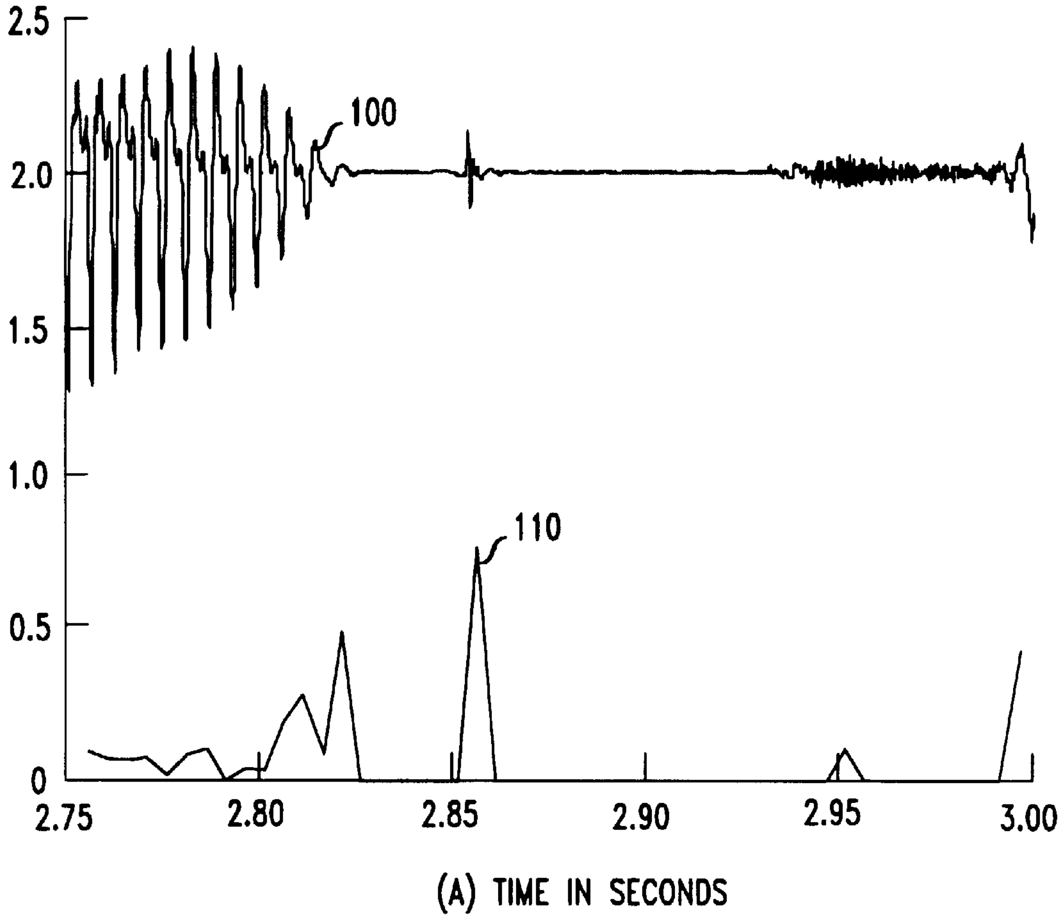
FIG. 1 depicts a speech signal and a measure of stationarity signal that is based on time domain analysis as disclosed herein.

FIG. 1 presents a time representation of a speech signal 100. It includes a loud voiced portion 10, a following silent portion 11, a following sudden short burst 12 followed by another silent portion 13, and a terminating unvoiced portion 14. Based on the above notion of "stationarity", one might expect that whatever technique is used to quantify the signal's non-stationarity, the transitions between the regions should be significantly more non-stationary than elsewhere in the signal's different regions. However, non-stationarities would be also expected inside these regions. What is sought, then, is a function that reflects the level of stationarity or non-stationarity in the analyzed signal and, advantageously, it should have the form $$f(t)=\begin{cases}\sim 0 & \text{when a speech segment is stationary}\\ \sim 1 & \text{when a speech segment is non-stationary}\end{cases} \tag{1}$$

In accordance with our first method, a signal is developed for controlling the modifications of the FIG. 1 speech signal, based on the equation $$C_n^1=\frac{|E_n-E_{n-1}|}{E_n+E_{n-1}} \tag{2}$$

where $E_n$ is the RMS value of the speech signal within a time interval n, and $E_{n-1}$ is the RMS value of the speech signal within the previous time interval (n−1). That is, $$E_n=\sqrt{\frac{1}{N+1}\sum_{m=-N/2}^{N/2}x^2(n+m)}\ , \tag{3}$$

where x(n) is the speech signal over an interval of N+1 samples. The time intervals of $E_n$ and $E_n$−1 may, but don't have to, overlap; although, in our experiments we employed a 50% overlap.

We discovered that the aforementioned artifacts problem is related to the level of stationarity (the quality of being stationary, which is defined below) of the speech signal within a small interval, or window. In particular, we discovered that speech signals portions that are highly non-stationary cause artifacts when they scaled and/or smoothed. We concluded, therefore, that the level of non-stationarity of the speech signal is a useful parameter to employ when performing time scaling of synthesized speech and that, in general, it is not desirable to modify or smooth highly non-stationary areas of speech, because doing so introduces artifacts in the resulting signal. To that end, a measure of the speech signal's non-stationarity must be developed.

Signal 110 in FIG. 1 represents a pictorial view of the value of $C_n^1$ for speech signal 100, and it can be observed that signal 110 does appear to be a measure of the speech signal's stationarity. Signal 110 peaks at the transition for region 10 to region 11, peaks again during burst 12, and displays another (smaller) peak close to the transition from region 13 to region 14. The time domain criterion which equation (1) yields is very easy to compute.

Figure 2:
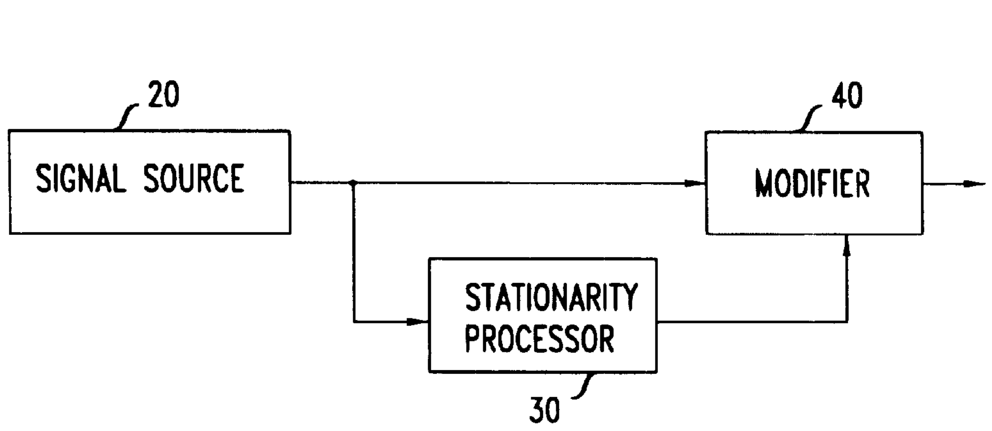
FIG. 2 presents a block diagram of an arrangement for modifying the signal of FIG. 1 in accordance with the principles disclosed herein.

FIG. 2 presents a block diagram of a simple structure for controlling the modification of a speech signal. Block 20 corresponds to the element that creates the signal to be modified. It can be, for example, a conventional speech synthesis system that retrieves speech units from a large store and concatenates them. The output signal of block 20 is applied to stationarity processor 30 that, in embodiments that employ the control of equation (1), develops the signal $C_n^1$. Both the output signal of block 20 and the developed control signal $C_n^1$ are applied to modification block 40. Block 40 is also conventional. It time-scales, interpolates, and/or smoothes the signal applied by block 20 with whatever algorithm the designer chooses. Block 40 differs from conventional signal modifiers in that whatever control is finally developed for modifying the signal of block 20 (such as time-scaling it), β, that control signal is augmented by the modification control signal ƒ(t) via the relationship.

$$\beta=1+[1-f(t)]b, \tag{4}$$

where b is the desired relative modification of the original duration (in percent). For example, when the speech segment that is to be time scaled is stationary (i.e. ƒ(t)≅0), then β≅1+b. When a segment is non-stationary (i.e. ƒ(t)≅1), then β≅1, which means that no time scale modifications are carried out on this speech segment.

Incorporating signal ƒ(t) in block 40 thus makes block 40 sensitive to the characteristics of the signal being modified. When the $C_n^1$ signal that is developed pursuant to equation (1) is used as the stationarity measure signal ƒ(t), the stationarity of the signal is basically related to variations of the signal's RMS value.

We realized that because the $E_n$ values are sensitive only to time domain variations in the speech signal, the $C_n^1$ criterion is unable to detect variability in the frequency domain, such as the transition rate of certain spectral parameters. Indeed, the RMS based criterion is very noisy during voiced signals (see, for example, signal 110 in region 10 of FIG. 1).

In a separate and relatively unrelated work, Atal proposed a temporal decomposition method for speech that is time-adaptive. See Atal in "Efficient coding of the lpc parameters by temporal decomposition," *Proc. IEEE Int. Conf. Acoust., Speech, Signal Processing,* Vol. 1, pp. 81–84, 1983. Asserting that the method proposed by Atal is computationally costly, Nandasena et al recently presented a simplified approach in "Spectral stability based event localizing temporal decompositions," in *Proc. IEEE Int. Conf. Acoust., Speech Signal Processing,* Vol. 2, (Seattle, USA), pp. 957–960, 1998. The Nandasena et al approach computes the transition rate of spectral parameters like Line Spectrum Frequencies (LSFs). Specifically, they proposed to consider the Spectral Feature Transition Rate (SFTR)

Figure 3:
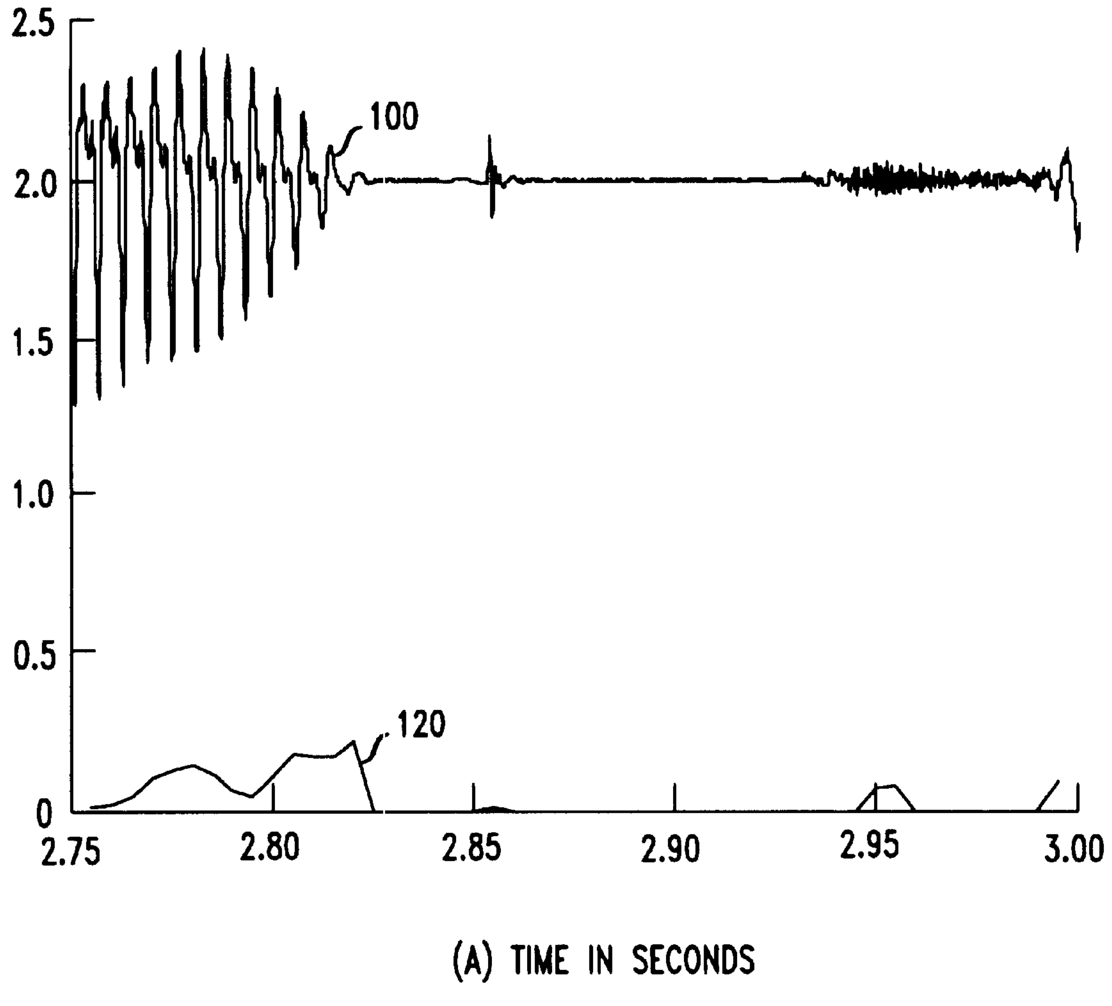
FIG. 3 depicts the speech signal of FIG. 1 and a measure of stationarity signal that is based on frequency domain analysis as disclosed herein.

*SFTR*

$$s(n)=\sum_{i=1}^{P}c_i(n)^2,\ 1\le n\le N \tag{5}$$

where $$c_i(n)=\frac{\sum_{m=-M}^{M}my_i(n+m)}{\sum_{m=-M}^{M}m^2} \tag{6}$$

where $y_i$ is the $i^{th}$ spectral parameter about a time window [n−M, n+M]. We discovered that the gradient of the regression line of the evolution of Line Spectrum Frequencies (LSFs) in time, as described by Nandasena et al, can be employed to account for variability in the frequency domain. Hence, in accordance with our second method, a criterion is developed from the FIG. 1 speech signal that is based on the equation $$f(t)=C_n^2=\frac{2}{1+e^{-\beta_1 s(n)}}-1 \tag{7}$$

where s(n) is the value derived from the Nandasena et al equation (5), and $\beta_1$ is a predefined weight factor. In evaluating speech data, we determined that for 10 spectral lines (i.e. P=1), the value $\beta_1$ =20 is reasonable. FIG. 3 shows the speech signal of FIG. 1, along with the transition rate of the spectral parameters (curve 120). Curve 120 fails to detect the stop signal in region 12, but appears to be more sensitive to the transition in the spectrum characteristics in the voiced region 10.

Figure 4:
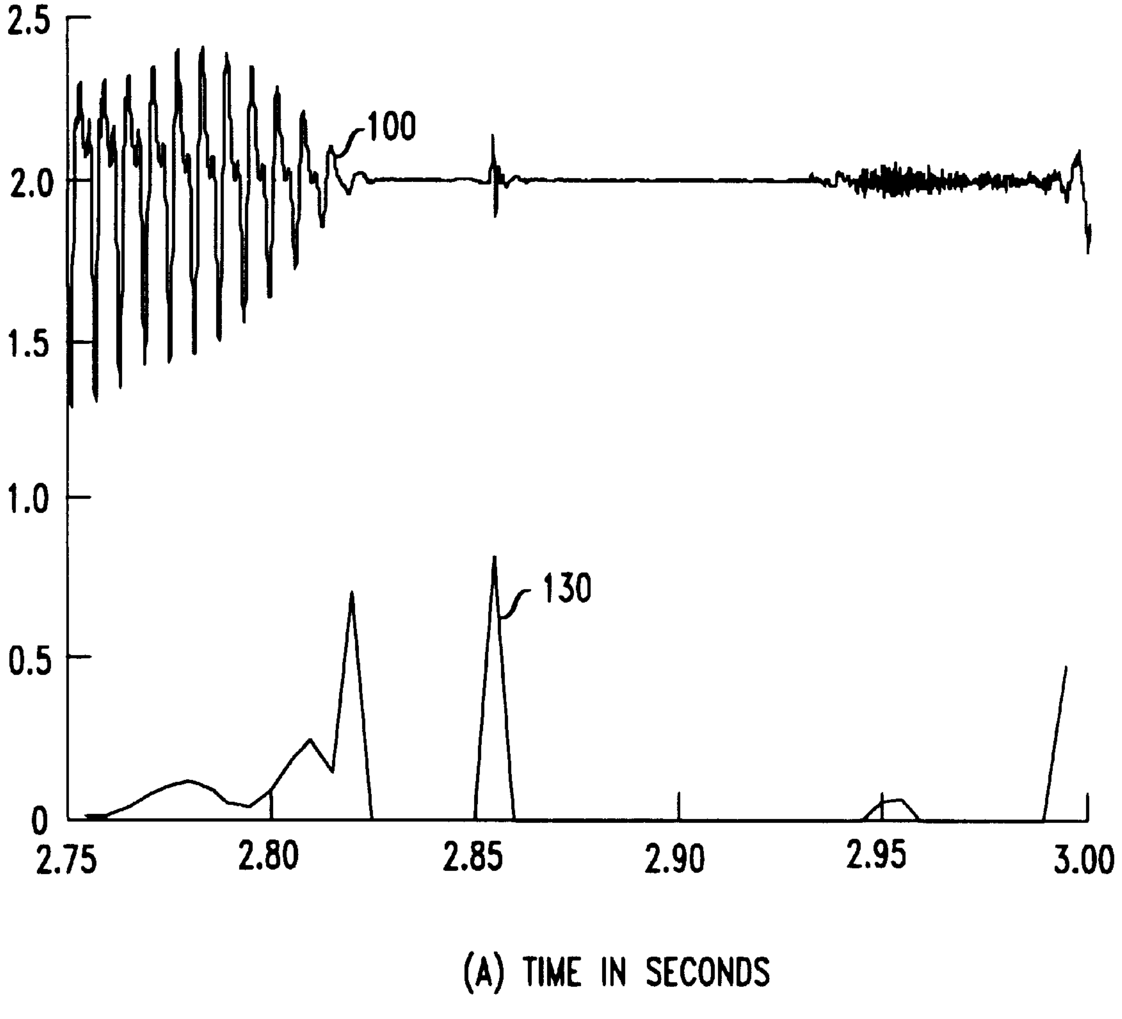
FIG. 4 depicts the speech signal of FIG. 1 and a measure of stationarity signal that is based on both time and frequency domain analysis as disclosed herein.

While an embodiment that follows the equation (7) relationship is useful for voiced sounds, FIG. 4 suggests that it is not appropriate for speech events with short duration because the gradient of the regression line in these cases is close to zero.

In accordance with our third embodiment, a combination of $C_n^1$ and $C_n^2$ is employed which follows the relationship $$f(t) = C_n^3 = \frac{2}{1 + e^{-\beta_2 s(n) - \alpha C_n^1}} - 1. \tag{8}$$

where $\beta_2$ and $\alpha$ are preselected constants. We determined that the values $\beta_2 = 17$ and $$\alpha = \begin{cases} 18.43 \cdot \left(1.001 - 1.0049 e^{C_n^1} + C_n^1 e^{C_n^1}\right) & \text{if } C_n^1 \leq 0.5 \\ 0.5 & \text{if } C_n^1 \leq 0.5 \end{cases} \tag{9}$$

yield good results. FIG. 5 shows the speech signal of FIG. 1 and the results of applying the equation (9) relationship.

We claim:

1. A method for developing a measure of non-stationarity of an input speech signal comprising the steps of:

dividing said input signal into intervals;

evaluating a measure of variability of a selected attribute of said input signal in each of said intervals;

from said measure of variability, developing an analog measure of non-stationarity of said input signal for every one of said intervals.

2. The method of claim 1 where said intervals are uniform, with a length that is on the order of 30 msec.

3. The method of claim 1 where said step of developing an analog measure of non-stationarity of said input signal for each of said intervals develops a measure that is bounded by 0 and 1.

4. The method of claim 1 where said step of evaluating a measure of variability considers a time-domain characteristic of said input signal.

5. The method of claim 1 where said step of evaluating a measure of variability evaluates the RMS value of each interval of said input signal, $E_n$, in accordance with the relationship $$E_n = \sqrt{\frac{1}{N+1} \sum_{m=-N/2}^{N/2} x^2(n+m)},$$

where x represents a sample of said input signal in said interval, and N+1 is the number of such samples in said interval, developing a measure of non-stationarity of said input signal by evaluating the quotient $$\frac{|E_n - E_{n-1}|}{E_n + E_{n-1}}$$

each of said intervals.

6. The method of claim 1 where said step of evaluating a measure of variability considers a frequency-domain characteristic of said input signal.

7. The method of claim 1 where said step of evaluating a measure of variability evaluates $$\frac{2}{1 + e^{-\beta_1 s(n)}} - 1,$$

where $\beta_1$ is a preselected constant and s(n) is a spectral transition rate in interval n of a selected number of spectral lines of said input signal.

8. The method of claim 7 where said s(n) signal is developed in accordance with the relationship $$s(n) = \sum_{i=1}^{P} (c_i(n))^2,$$

where $$c_i(n) = \frac{\sum_{m=-M}^{M} m y_i(n+m)}{\sum_{m=-M}^{M} m^2},$$

and $y_i$ is the $i^{th}$ spectral line.

9. The method of claim 1 where said step of evaluating a measure of variability considers a time domain and a frequency-domain characteristic of said input signal.

10. The method of claim 9 where said step of evaluating a measure of variability evaluates $$\frac{2}{1 + e^{-\beta_2 s(n) - \alpha C_n^1}} - 1,$$

where $\beta_2$ is a preselected constant, $\alpha$ is another preselected constant, s(n) is a spectral transition rate in interval n of a selected number of spectral lines of said input signal, and $$C_n^1 = \frac{|E_n - E_{n-1}|}{E_n + E_{n-1}}$$

where $E_n$ is the RMS value of said input signal within a time interval n, and $E_{n-1}$ is the RMS value of the speech signal within a time interval (n−1).

11. A method for modifying a speech signal comprising the steps of:

dividing said speech signal into uniform time intervals, for every interval, computing an analog stationarity measure, ƒ(n), that is related to energy of said signal within said interval, and modifying said signal within said interval by a factor that is based on said measure.

12. The method of claim 11 where said measure has a range that approximately spans the interval 0 to 1.

13. The method of claim 11 where $$f(n) = \frac{|E_n - E_{n-1}|}{E_n + E_{n-1}},$$

$E_n$ is the a root mean squared value of the speech signal within time interval n, and $E_{n-1}$ is a root mean squared value of the speech signal within time interval (n−1).

14. The method of claim 13 where $$E_n = \sqrt{\frac{1}{N+1}\sum_{m=-N/2}^{N/2} x^2(n+m)},$$

where x(n) is the speech signal over an interval of N+1 samples.

15. The method of claim 11 where said time intervals do not overlap.

16. The method of claim 11 where said time intervals overlap by a preselected amount.

17. The method of claim 11 where said measure is related to a root mean square measure of said signal in said interval.

18. The method of claim 11 where said factor, β, is β=1+[1−f(n)]b, where b is a preselected constant.

19. The method of claim 11 where said modifying is time scaling of said signal in said time interval.

20. A method for modifying a speech signal comprising the steps of:

dividing said signal into time intervals, for every interval, n, computing an analog stationarity measure, f(n), that is related to spectral parameters of said signal within said interval, and modifying said signal within said interval by a scaling factor that is based on said measure.

21. The method of claim 20 where said modifying is time scaling of said signal in said time interval.

22. The method of claim 20 where said spectral parameters measure corresponds to spectral feature transition rate.

23. The method of claim 20 where said spectral parameters measure is related to $$s(n) = \sum_{i=1}^{P} c_i(n)^2,$$

where $$c_i(n) = \frac{\sum_{m=-M}^{M} m y_i(n+m)}{\sum_{m=-M}^{M} m^2},$$

$y_i$ is an $i^{th}$ spectral parameter about a time window [n−M, n+M].

24. The method of claim 23 where said scaling factor is $$\frac{2}{1+e^{-\beta_1 s(n)}} - 1,$$

where $\beta_1$ is a preselected weight factor.

25. The method of claim 23 where said scaling factor is $$\frac{2}{1+e^{-\beta_2 s(n) - \alpha C_n^1}} - 1,$$

where $\beta_2$ and α are preselected constants, $$C_n^1 = \frac{|E_n - E_{n-1}|}{E_n + E_{n-1}},$$

$E_n$ is the a root mean squared value of the speech signal within time interval n, and $E_{n-1}$ is a root mean squared value of the speech signal within time interval (n−1).

* * * * *